United States Patent
Escandell et al.

(10) Patent No.: US 8,533,418 B2
(45) Date of Patent: Sep. 10, 2013

(54) MEMORY ALLOCATION WITH IDENTIFICATION OF REQUESTING LOADABLE KERNEL MODULE

(75) Inventors: Marco Cabrera Escandell, Austin, TX (US); Lucas McLane, Austin, TX (US); Eduardo Reyes, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 12/827,740

(22) Filed: Jun. 30, 2010

(65) Prior Publication Data

US 2012/0005445 A1    Jan. 5, 2012

(51) Int. Cl.
    *G06F 12/00*    (2006.01)
(52) U.S. Cl.
    USPC ........... 711/170; 711/154; 711/173; 717/120; 717/162; 719/330
(58) Field of Classification Search
    USPC ................ 711/154, 170, 173; 717/120, 162; 719/330
    See application file for complete search history.

(56) References Cited

U.S. PATENT DOCUMENTS

| 5,412,798 | A | 5/1995 | Garney |
| 7,146,611 | B1 * | 12/2006 | Phillips .................. 717/174 |
| 7,171,550 | B1 * | 1/2007 | Gryck et al. .............. 713/100 |
| 7,334,104 | B2 | 2/2008 | Piper et al. |
| 7,415,710 | B1 * | 8/2008 | Yan et al. .................. 718/105 |
| 2003/0074551 | A1 * | 4/2003 | Chandramouleeswaran et al. ......................... 713/100 |
| 2005/0028151 | A1 * | 2/2005 | Roth et al. ................. 717/162 |
| 2005/0071856 | A1 * | 3/2005 | Kumar et al. ............. 719/330 |
| 2006/0041878 | A1 * | 2/2006 | Albot et al. ............... 717/162 |
| 2008/0148048 | A1 * | 6/2008 | Govil et al. ............... 713/164 |
| 2009/0013145 | A1 * | 1/2009 | Chittigala ................. 711/170 |

OTHER PUBLICATIONS

Technical Disclosure entitled Method of Control for Memory Segment Input/Output—Maddalozzo, Jr., et al. from IP.COM Prior Art Database vol. 40, No. 01 Jan. 1997 http://www.priorartdatabase.com/IPCOM/000118390/.

* cited by examiner

*Primary Examiner* — Arpan P. Savla
(74) *Attorney, Agent, or Firm* — Matthew B. Talpis; Gregory K. Goshorn; Greg Goshorn, P.C.

(57) ABSTRACT

A technique that supports improved debugging of kernel loadable modules (KLMs) that involves allocating a first portion of a memory and detecting a first kernel loadable module (KLM) requesting an allocation of at least a portion of the memory. The first KLM is then loaded into the first portion of the memory and a first identifier is associated with the first KLM and the first portion. The access of a second portion of the memory by the first KLM, the second portion being distinct from the first portion is detected and an indication that the first KLM has accessed the second portion is generated.

15 Claims, 3 Drawing Sheets

MEMORY ALLOCATION WITH IDENTIFICATION OF REQUESTING LOADABLE KERNEL MODULE

FIELD AND BACKGROUND

Computer systems are well known and have attained widespread use for providing computer power to many segments of today's society. Computers are available in many different forms such as a desktop, floor standing, and portable computers and include, e.g., one or more central processing units (CPUs), associated volatile and non-volatile memory, and operating system software. Some computer systems also include a display, an input-output device such as a keyboard and/or a mouse, one or more storage devices such as hard disk drives, and, in many instances, a network interface adapter. Some computer systems function as individual workstations. Others function as servers supporting network activity of various sorts and possibly numerous client systems. Examples of such computer systems are IBM's e-Server (trademark of IBM) series and Lenovo's ThinkPad (trademark of Lenovo) series computer systems. As computers have grown in importance, they have also grown in complexity. The increasing complexity of computers has also caused an increase in the complexity of developing and debugging programs for those computers.

SUMMARY

In one illustrative embodiment, a method comprising allocating a first portion of a memory and detecting a first kernel loadable module (KLM) requesting an allocation of at least a portion of the memory is provided. The method further includes loading the first KLM into the first portion of the memory and associating a first identifier with the first KLM and the first portion. In additional, the method includes detecting access of a second portion of the memory by the first KLM, the second portion being distinct from the first portion and generating an indication that the first KLM has accessed the second portion.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present disclosure will be described in, or will become apparent to those of ordinary skill in the art in view of, the following detailed description of the example embodiments of the present disclosure.

BRIEF DESCRIPTION OF DRAWINGS

The disclosure, as well as a preferred mode of use and further objectives and advantages thereof, will best be understood by reference to the following detailed description of illustrative embodiments when read in conjunction with the accompanying drawings, wherein.

DETAILED DESCRIPTION

Figures 1, 4:
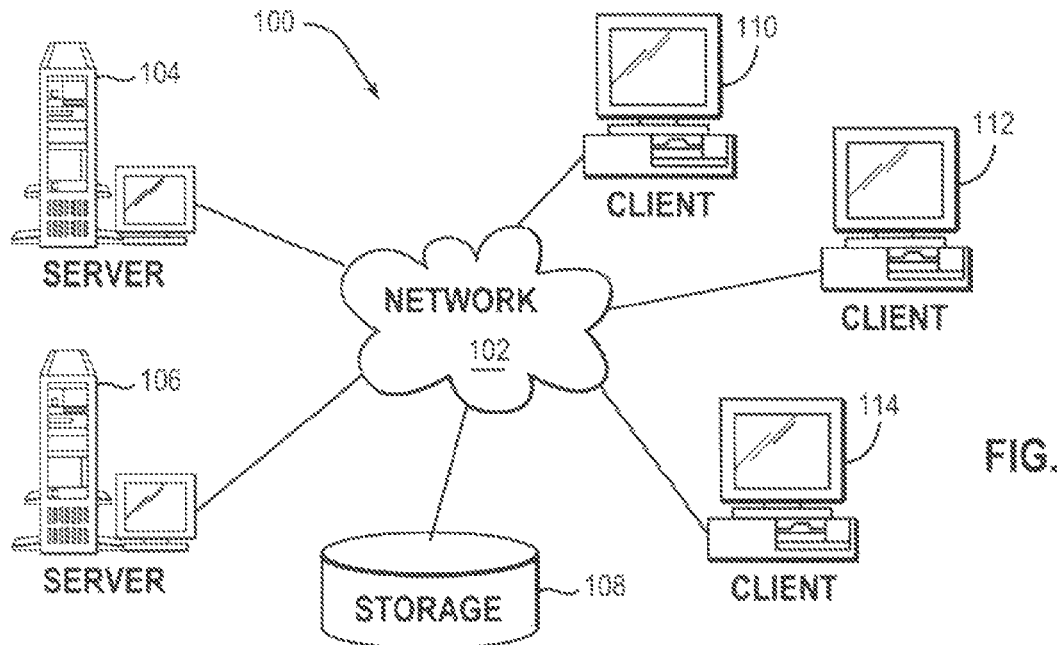
FIG. 1 is a pictorial representation of an example distributed data processing system in which aspects of the illustrative embodiments may be implemented.
FIG. 4 is a block diagram illustrating further details of a table in accordance with one illustrative embodiment.

In computing, a kernel loadable module (KLM) or Kernel Module (KMOD) is an object file that contains code to extend the running kernel, or "base kernel", of an operating system with a modular kernel. For example, most current Unix-like systems and Microsoft Windows support kernel loadable modules, although they might use a different name for them, such as "kernel extension" ("kext") in the Apple Macintosh OS X. KLMs are typically used to add support for new hardware and/or file systems, or for adding system calls. When the functionality provided by a KLM is desired, loading is initiated by the operating system and the KLM is allocated space in memory. When no longer required, the KLM can be unloaded in order to free memory.

Without KLMs, an operating system would have to have all possible anticipated functionality already compiled directly into the base kernel, such as a static kernel. Much of that functionality would reside in memory without being used, wasting memory, and would require that users rebuild and reboot the base kernel every time new functionality is desired. Most operating systems supporting KLMs will include modules to support common functionality.

One criticism of preferring a modular kernel over a static kernel is the so-called fragmentation penalty. The base kernel is typically unpacked into contiguous real memory by the setup routines which avoids fragmenting the base kernel code in memory. Once the system is in a state where KLMs may be inserted—for example, once the file systems have been mounted that contain the modules—it is probable that any new kernel code insertion will cause the kernel to become fragmented, thereby introducing a performance penalty.

A monolithic kernel based operating system, such as Linux, IBM's AIX, Sun Microsystems' Solaris, Microsoft® Windows® and Apple's Mac OS X, is an operating system where the majority of the operating system functionality is called the kernel and runs in a privileged mode. This differs from a micro-kernel type operating system, which runs only basic functionality as the kernel (such as inter-process communication, scheduling, basic input/output and memory management) and pushes other functionality outside the privileged space (such as drivers, network stacks and file systems). The monolithic nature of a kernel does not prevent a monolithic kernel, such as Linux, from using KLMs to dynamically alter the monolithic kernel at run time.

Dynamically alterable means that new functionality can be loaded into the kernel and unloaded from the kernel at runtime and without restarting and rebooting the operating system. Indeed, one KLM can dynamically add functionality using other KLMs. One advantage to KLMs is that the memory footprint of a kernel can be decreased by dynamically loading only those elements that are needed. For example, in an embedded system, where memory and processing resources are typically limited, the use of KLMs can allow the embedded system to use a small base kernel and only load KLMs as needed to avoid loading unused functionality into a limited memory space. A consequence of the use of KLMs is that memory must be allocated to a KLM as it is initiated or loaded. A problem arising from dynamically loading KLMs is efficiently allocating memory and avoiding memory allocation conflicts.

Software designers are often required to handle a multitude of hardware and application software configurations. When designing program logic to be generally applicable for various hardware and software configurations, a software designer may consider many possible KLMs.

When a problem forces a computer to be powered down and rebooted, the performance of the startup systems becomes significant. Some computer systems may take hours or even days to return to service once they are powered down. Thus, program developers work to decrease the time spent by systems related to startup. These solutions must generally be flexible enough to apply to many hardware and software configurations.

One aspect of system startup that may consume significant amounts of startup time is the allocation of memory to various tasks. For example, a particularly complicated system may require around twenty five minutes to startup the system, with a significant portion of that time dedicated to allocating memory. For another example, memory to be allocated within a system during startup may involve allocating memory area to be used as global system memory which may be known as heap memory.

Heap memory allocations within monolithic operating system kernels are typically treated as global areas within the kernel and KLMs. Specific allocations are based on the size of the requested memory; however, determining which particular functionality will be loaded into which particular physical memory can be difficult to determine using common programmatic methods. For example, currently there exists no programmatic method or interface for determining, at memory allocation time, which kernel subsystem or KLM, such as a device driver, is requesting memory. Various techniques exist for aiding this process such as strict programming guidelines and structure identification tags. The present disclosure provides a technique for logically dividing a kernel's heap based on the KLMs.

During runtime, KLMs may attempt to allocate large chunks of memory only to find that the memory is unavailable causing the operating system to not allocate the memory for the KLM and the additional functionality of the KLM to not be added to the operating system kernel. As KLMs often represent important functionality, such as device drivers, the inability to load a KLM can present a significant problem. One solution to running out of memory for the KLM is for the kernel to attempt to set aside a large amount of memory during startup for the heap, and when the kernel extension is loaded it can request this particular memory. A problem with this technique is that since the memory belongs to a global pool (the "heap") any other kernel extension or device driver can request the memory first because the system has no idea which KLM or extension is making the allocation. By properly segmenting this global pool based on individual KLMs, it would be possible to correctly reserve memory for the priority services that requested the memory.

Other problems related to traditional memory allocation schemes exist when memory profiling of specific KLMs or device drivers is desired. If it is desired to simulate that the system is running low on memory, then, traditionally, flags are set at boot time to lower the amount of memory that can be allocated from the heap. In this case the entire operating system becomes affected and it becomes difficult to force the heap allocator to fail for a specific request at the exact point where the test code is executed (i.e. kernel extensions) thus making this technique difficult to use. In addition, there currently does not exist the capability to limit the total amount of memory that individual kernel extensions can allocate for themselves at runtime. This disclosure describes a process of logically segmenting the kernel heap based on KLMs that can be applied to allow for such memory management and profiling, providing a set of interfaces for profiling tools to map specific memory allocations to specific KLMs (for example, device drivers, etc.).

Sometimes a misbehaving KLM overwrites another KLM's memory or the kernel's own memory resulting in a system crash. The process of logically segmenting the kernel heap based on kernel extensions can be applied to prevent kernel extensions from overwriting memory that belongs to other KLMs or to the kernel itself. This is accomplished by analyzing the stack at the time of a crash and checking it against the data structure managing kernel extension memory allocations. If the analysis concludes there is a misbehaving extension, the offending extension can potentially be unloaded and the system resuscitated, thus providing a way to recover from particular system crashes.

The present disclosure describes a memory allocation scheme for logically segmenting the virtual address space belonging to a kernel's heap based on individual KLMs. In one embodiment, this logical segmentation may be accomplished by the following steps: (1) stack examination to determine the calling routine during kernel memory allocation; (2) mapping the routine to a specific KLM; (3) storing this information along with the allocated virtual memory. More specifically, this information can be used to profile and/or limit the memory allocated at runtime on a per KLM basis, reserve memory for a future (potentially not yet loaded) KLM or to avoid and/or recover from particular kernel crashes.

Typically, runtime memory allocation is provided by a library or kernel service function call. Thus, information that is provided within the current stack during runtime memory allocation function call execution can be used to determine, via the loader which allocates the runtime memory, which KLM (if any) is allocating memory. This information may provide a mapping useful for logically tagging virtual addresses and/or pages being allocated within the kernel's heap to a specific KLM.

An KLM has some fundamental differences from elements that compile directly into the kernel and also from typical programs. A typical program has a main function where processing begins and typically ends, while a KLM has a module entry function and a module exit function. The module entry function is called when the KLM is inserted into the kernel, and the module exit function is called when the KLM is removed. Because the entry and exit functions may be user-defined, programmatic techniques exist to define which functions these are. For example, module_init and module_exit macros are used in the Linux operating system to define user-defined module entry and exit functions.

The process of KLM loading may be initiated in user space, for example, by using the UNIX insmod (insert module) function. In one embodiment, the insmod command defines the module to load and invokes the appropriate init_module user-space system call to begin the loading process. The init_module function then works through the system call layer and into the kernel to a kernel function such as sys_init_module. The sys_init_module function represents the primary function for module loading. Similarly, a system function to remove a module, such as an "rmmod" command, results in a system call to, for example, the delete_module function, which activates the kernel with a call to a KLM delete module command, such as "sys_delete_module", to remove the KLM from the kernel.

During KLM load and unload, the KLM subsystem may maintain a set of state variables to indicate the operation of a module. In one embodiment, if the module is being loaded, then the state is MODULE_STATE_COMING. If the module has been loaded and is available, it is MODULE_STATE_LIVE. Otherwise, if the module is being unloaded, then the state is MODULE_STATE_GOING.

When the kernel function sys_init_module is called, it begins with a permissions check to see whether the caller can actually perform the requested operation. Then, the load_module function is called, which handles the work to bring the module into the kernel and perform the necessary configuration, such as setting up appropriate data communications paths. The load_module function returns a module reference that refers to the newly loaded module. The KLM to be loaded is then loaded onto a list of all KLMs in the system, and any threads currently waiting for module state change are notified through a notifier list. Finally, the KLM's initiation function is called, and the newly loaded KLM's state is updated to indicate that it is loaded and live.

In one embodiment, KLMs may follow the Executable and Linkable Format (ELF). The internal details of module loading are ELF module parsing and manipulation. The load_module function begins by allocating a block of temporary memory to hold the entire ELF module. The ELF module is then read from user space into the temporary memory using the function copy_from_user. As an ELF object, this file has a particular structure that can be parsed and validated.

The next step is to perform a set of validity checks on the loaded image, including determining whether the file is valid, appropriate for the current architecture and other checks. When these validity checks are passed, the ELF image is parsed and, because the ELF KLMs are based at offset 0 until relocation, the relative offset into the temporary memory block is determined and stored. Any optional KLM arguments are loaded from user space into another allocated block of kernel memory, and the module state is updated to indicate that the KLM is being loaded. If per-CPU data is needed, as determined by checking the section headers in the KLM, a per-CPU block is allocated.

Previously, the KLM sections were loaded into kernel (temporary) memory, and it is known which are persistent and which can be removed. The next step is to allocate the final location for the module in memory and move the necessary sections (indicated in the ELF headers by SHF_ALLOC, or the sections that occupy memory during execution). Another allocation is then performed based on the size needed for the required sections of the module. Each section in the temporary ELF block is iterated, and those that need to be around for execution are copied into the new block. Symbol resolution for the KLM also occurs, which can resolve to symbols that are resident in the kernel (compiled into the kernel image) or symbols that are transient (exported from other modules).

The new KLM is then iterated for each remaining section and relocations performed. This step is architecture dependent and therefore relies on helper functions defined for that architecture. For example, in the Linux operating system, such helper functions may be found at ./linux/arch/<arch>/kernel/module.c. Finally, the instruction cache is flushed because the temporary ".text" sections were used, temporary module memory is freed, information about devices and drivers are exported from the kernel device model to the user space, and the KLM is returned to the load_module function.

In better understanding what follows, it is relevant to understand the function of storage keys. Storage keys are employed to facilitate processing in a computing environment. A storage key is associated with one or more blocks of real and/or virtual memory, and may also be known as a frame. The association between a particular storage key and a particular block of memory enables the kernel to reliably know what portion of memory is associated with a particular block of program code and/or data. Storage keys may be used to segregate blocks of storage, ensuring that code executing memory associated with one key does not improperly store into or fetch from memory blocks associated with a different storage key. A further function may be to provide an indication to the kernel as to which blocks have been referenced and may need to be written to auxiliary storage. In one embodiment, storage key support may be provided by a combination of hardware and software, such as that found in the AIX operating system and the International Business Machines' P-series systems.

As will be appreciated by one skilled in the art, the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present disclosure may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
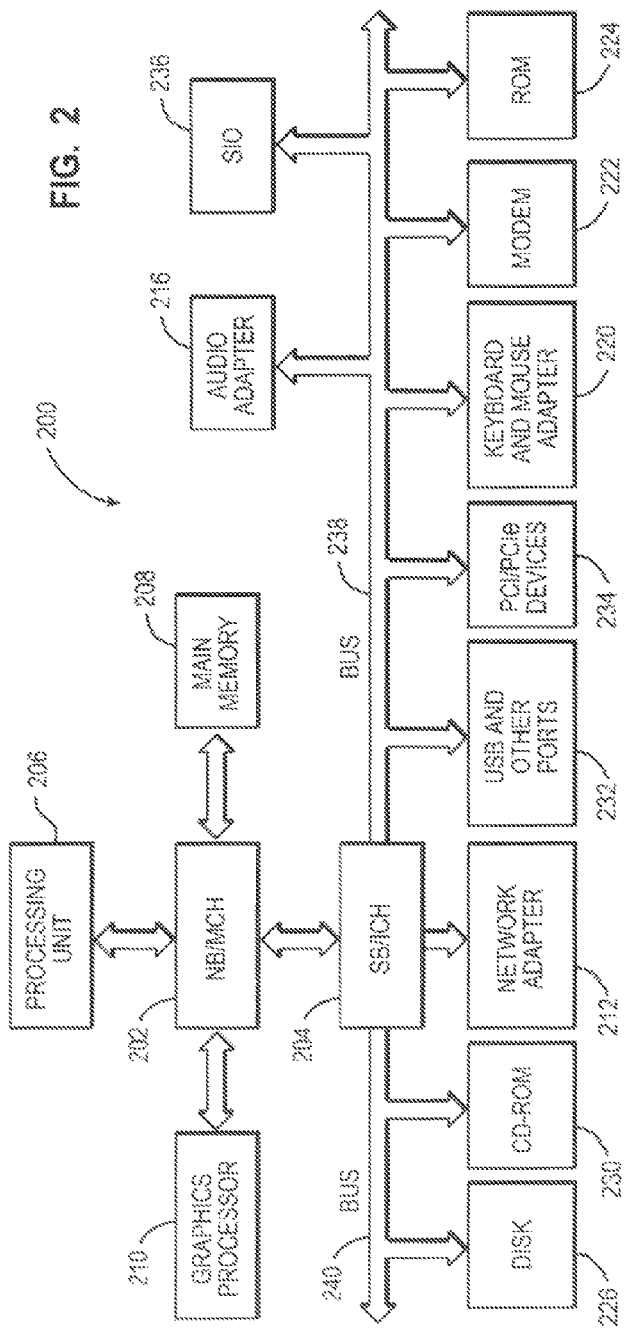
FIG. 2 is a block diagram of an example data processing system in which aspects of the illustrative embodiments may be implemented.

It can be appreciated that the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation, this is only an example and is not intended to state or imply any limitation with regard to the features of the present disclosure. To the contrary, the illustrative embodiments are intended to include distributed data processing environments and any other embodiments in which prioritization of virtual processors for use of cache resources of physical processors in order to avoid cold cache starts may be utilized.

With reference now to the figures and in particular with reference to FIGS. 1-2, example diagrams of data processing environments are provided in which illustrative embodiments of the present disclosure may be implemented. It should be appreciated that FIGS. 1-2 are only examples and are not intended to assert or imply any limitation with regard to the environments in which aspects or embodiments of the present disclosure may be implemented. Many modifications to the depicted environments may be made without departing from the spirit and scope of the present disclosure.

With reference now to the figures, FIG. 1 is a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like.

As stated above, FIG. 1 is intended as an example, not as an architectural limitation for different embodiments of the present disclosure, and therefore, the particular elements shown in FIG. 1 should not be considered limiting with regard to the environments in which the illustrative embodiments of the present disclosure may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present disclosure may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present disclosure may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, without departing from the spirit and scope of the present disclosure.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
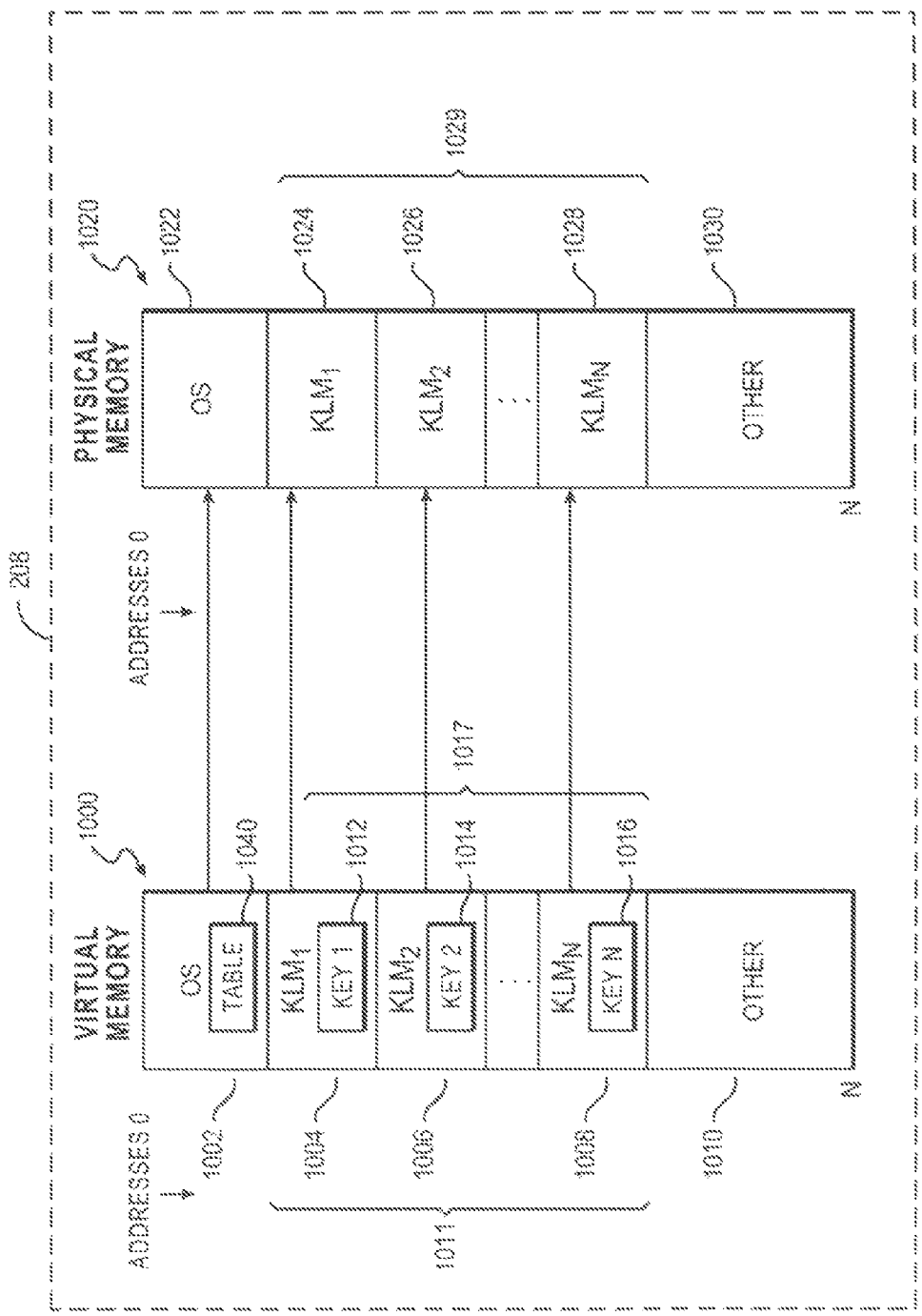
FIG. 3 is a block diagram illustrating virtual and physical memory in accordance with one illustrative embodiment.

FIG. 3 is a block diagram illustrating virtual and physical memory according to one embodiment of the present disclosure. The operating system associated with system 200 may divide memory 208 into two types, virtual memory 1000 and physical memory 1020. Virtual memory 1000 represents the amount of memory available to one or more programs executing under the operating system. The amount of virtual memory 1000 available to a program is independent of the actual amount of physical memory 1020 in system 200. Virtual memory 1000 is accessed via the use of an address which represents the memory location in the virtual memory 1000 to be accessed. In the disclosed embodiment, each executing program, including the operating system itself, has a distinct associated virtual memory 1000. Physical memory 1020 represents the physical memory installed in system 200 and, similar to virtual memory 1000, is accessed using an address to indicate a particular element of the physical memory 1020 to use. Virtual memory 1000 addresses are mapped into physical memory 1020 addresses by the operating system or other suitable technique, such as a memory management unit. More specifically, data stored in virtual memory 1000 is physically stored in physical memory 1020, so when a program accesses an address in virtual memory 1000, that location must be translated into the actual location in physical memory 1020.

Virtual memory 1000 further includes an operating system (OS) section 1002, a first KLM section 1004, a second KLM section 1006, an n-th KLM section 1008 and an other section 1010. In the disclosed embodiment, virtual memory 1000 illustrates the virtual memory space used by the operating system and KLM functions, which may operate in a privileged mode. OS section 1002 represents a portion of virtual memory 1000 allocated for use by the operating system itself, such as the contiguous area of memory allocated to the operating system during initial startup of the operating system. The other section 1010 represents the memory remaining in virtual memory 1000 for general allocation by the operating system, such as heap memory. As previously discussed, there are various difficulties associated with the loading and debugging of KLMs into the operating system as determining which KLM has caused a system crash is problematic. Each KLM section 1004, 1006 and 1008 represents a distinct portion of virtual memory 1000 allocated by the operating system for use by a particular KLM and may be collectively and/or generically referred to as KLM sections 1011. By allocating distinct sections of virtual memory 1000 for use by a particular KLM, the operating system can determine if a KLM has attempted to access memory out of the KLM's assigned section, which supports an improved capability to determine that a particular KLM requires debugging. The size and number of the KLM sections 1011 may be determined using any suitable technique. For example, the size and number of KLM sections 1011 may be determined based on a user-setting based on the total amount of virtual memory 1000 available to the operating system and the typical amount of memory used.

Physical memory 1020 further includes a physical OS section 1022, a first physical KLM section 1024, a second physical KLM section 1026, an n-th physical KLM section 1028 and a physical other section 1030. Physical OS section 1022 represents physical memory used by the operating system for operating system data and/or instructions. Other physical section 1030 represents physical memory available for other uses, such as unallocated physical memory 1020. Physical other section 1030 Physical KLM sections 1022, 1026 and 1028 may be collectively referred to as physical KLM sections 1029. Each physical KLM section 1022, 1026 and 1028 represents physical memory respectively allocated to a particular KLM, such as KLM section 1004 being mapped into physical KLM section 1024, KLM section 1006 being mapped into physical KLM section 1026 and KLM section 1008 being mapped into physical KLM section 1028. More specifically, as virtual memory KLM sections 1011 are allocated to KLMs, those virtual memory sections are mapped into physical KLM sections 1029. The physical KLM sections 1029 are not required to be in physical memory simultaneously, but may, for example, be swapped out to other storage locations using suitable techniques.

In one embodiment, the address space for virtual memory 1000 is 64-bits in size and each KLM section 1004, 1006 and 1008 is 500 megabytes (MB) in size and 200 KLM sections 1011 are allocated. Alternatively, the size and number of KLM sections 1011 may be dynamically allocated by the operating system. In one embodiment, KLM sections 1011 represent an overall pool of memory allocated by the operating system for use by KLMs that is segmented initially into a fixed size section when a KLM is loaded, such as 500 megabytes, that can be increased upon a request for additional memory by a KLM. For example, in a system 200 with a limited virtual memory space 1000, the initial size of KLM section 1004 may be five megabytes with the ability to grow KLM section 1004 to some fixed maximum, such as 500 megabytes or the total space allocated for KLM sections 1011, or without a fixed maximum. Such a dynamic growth ability for KLM section 1004, for example, would allow a system with limited virtual memory to more precisely allocate memory to KLMs as needed.

In addition, first KLM section 1004 has an associated first storage key 1012, second KLM section 1006 has an associated second storage key 1014 and n-th KLM section 1008 has an associated n-th storage key 1016. Storage keys 1012, 1014 and 1016 may be collectively referred to as storage keys 1017. Storage keys 1017 may be used to identify the particular section 1011 of virtual memory 1000 allocated to a particular KLM. For example, a first KLM may be stored in firm KLM section 1004 and be associated with first storage key 1012.

In one embodiment, the operating system maintains a table 1040. Table 1040 tracks the relationship between KLMs loaded into the operating system, storage keys 1017 and virtual memory 1000. Table 1040 is described in more detail in association with FIG. 4.

FIG. 4 illustrates further details of table 1040 according to one embodiment of the present disclosure. Table 1040 further includes a KLM identity entry 2000, a storage key entry 2002 and a memory address entry 2004. KLM identity entry 2000 indicates the identity of the KLM associated with the associated storage key entry 2002 and memory address entry 2004. For example, KLM identity entry 2000 may indicate that the KLM is for the "file system" or a particular device. The storage key entry 2002 indicates the storage key, such as storage key 1012, associated with a given KLM. The operating system can use storage key entry 2002 to determine the identity of the KLM which accessed memory outside of the KLM's associated virtual memory section, such as section 1004. The memory address entry 2004 may indicate the memory range associated with the storage key entry 2002. Alternatively, the memory address entry 2004 may indicate the starting point of the block of memory associated with the storage key entry 2002. Memory address entry 2004 may represent either the physical memory address or the virtual memory address depending on the particular embodiment of the table 1040. Also alternatively, the memory address entry 2004 may include multiple entries for each KLM if multiple blocks of memory are associated with the KLM. In yet another alternative, memory address entry 2004 may be omitted, for example, when the operating system tracks the storage key-to-memory location independently. For example, table entry 2006 indicates that a KLM identified as "KLM1" is associated with storage key 1 and has associated memory address information of 0x000D (which represents an arbitrary memory address for illustrative purposes only and should not be construed to limit the disclosure to any particular memory size or addressing system). In one embodiment, storage keys may be reused, such as when there are more KLMs to be loaded than are available storage keys. For example, table entries 2008 and 2010 represent two separate KLMs, identified as KLM2 and KLM3, each with the same storage key of "2".

Figure 5:
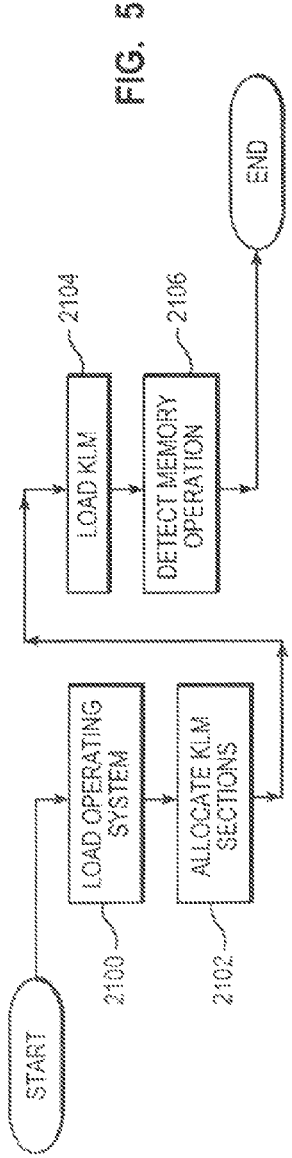
FIG. 5 is a flowchart illustrating a method of detecting improper memory accesses by KLMs in accordance with one illustrative embodiment.

FIG. 5 is a flowchart illustrating a method of detecting improper memory accesses by KLMs according to one embodiment of the present disclosure. The method begins at block 2100 where an operating system is loaded into system 200. Next, at block 2102, the operating system allocates one or more KLM sections 1011 and associates a storage key 1017 with each KLM section 1011. Then, at block 2104, a KLM is loaded into a KLM section, such as section 1004, and table 1040 is updated to indicate the loaded KLM, the related storage key 1017 and the related memory area. At block 2016, the operating system detects whether a loaded KLM has accessed an improper memory area. More specifically, if the operating system detects that a loaded KLM, such as KLM1 in entry 2006, accesses memory not associated with KLM1's storage key 1012, then the operating system can take appropriate action. For example, the operating system may log the identity and other information, such as information related to system 200 generally, related to the KLM that improperly accessed memory to aid generally that may aid in debugging the KLM. For another example, the operating system may invoke an error handling or debugging routine that recovers from the improper operation, such as by returning to a known good state. In general, the operating system may take any suitable action in response to detecting that the KLM has improperly accessed memory. For yet another example, the operating system may display an appropriate error message and a user (not shown) may determine an appropriate action to take, such as indicating an alternate KLM to use or aborting the operation.

In an alternative embodiment, at block 2104, the KLM to be loaded may use memory from multiple KLM sections 1011. For example, if KLM section 1004 is 100,000 bytes in size, and KLM1 is only using 25,000 bytes, then KLM section 1004 has 75,000 bytes unused. If KLM section 1006 is 100,000 bytes in size, and KLM2 requires 150,000 bytes of space, then KLM2 would not fit solely in KLM section 1006. In this embodiment, the operating system could allocate a portion of KLM section 1004 to KLM2, even though KLM section 1004 is allocated to KLM1, so that KLM2 has sufficient memory space to be loaded. In this embodiment, table 1040 may use multiple entries in storage key entry 2002 to indicate that KLM2 may access memory associated with multiple storage keys 1017. Alternatively, the operating system could allocate multiple portions of multiple KLM sections 1011, such as allocating a portion of KLM section 1004 and KLM section 1006 to allow a particularly large KLM3 to be loaded and use memory in multiple KLM sections 1004, 1006 and 1008. Also alternatively, in order to avoid having a KLM be associated with multiple storage keys 1017, memory could be dynamically reallocated from unused and/or partially used KLM sections 1011 to increase the size of other KLM sections 1011 and the reallocated memory be associated with the storage key 1017 for the KLM to be loaded, such as decreasing the size of KLM section 1004 to increase the size of KLM section 1008 and changing the association of the memory from storage key 1012 to storage key 1016.

Typical operating systems allocate physical memory based on page size. Address translation from virtual memory to physical memory is based on page table entries. Page table entries control the access rights and the presence of a given virtual address. By segmenting the virtual address space based on kernel extensions, the operating system can detect and avoid one kernel extension overwriting physical pages that belong to other kernel extensions. Specifically, by leaving a gap in the virtual address space of one page table entry, the memory allocated from the heap for one kernel extension can be isolated from that allocated to other kernel extensions.

Once the technique described above is in place, kernel extension virtual memory may be adequately tagged and appropriate boundaries between individual virtual memory pages allocated by various kernel extensions may get created. Thus, when a page fault is generated because the memory is not present on the system, the faulty address (the virtual address) can be retrieved as well as the address of the instruction that generated the page fault. With this information at hand the loader can be queried as to what kernel extension was responsible for causing the page fault. Once it becomes known which kernel extension (if any) the heap virtual address belongs to, certain logic/rules can be applied to determine if the kernel should crash or not. In one embodiment, three basic rules are used:

1. If the address of the offending instruction belongs to the kernel itself or to some critical kernel extension a crash is inevitable.
2. If the address of the offending instruction belongs to a kernel extension that is not the owner of mapped virtual memory being accessed there will be a possible crash as it might be possible to issue an unload command to the KLM to give it a chance to clean up and recover the memory that was previously allocated from the heap.
3. If the address of the offending instruction belongs to a non-critical kernel extension accessing unmapped virtual memory (i.e. page gap/boundaries) a crash can be prevented by unloading the extension.

In the drawings and specifications there has been set forth a preferred embodiment of the invention and, although specific terms are used, the description thus given uses terminology in a generic and descriptive sense only and not for purposes of limitation.

What is claimed is:

1. A method comprising:
    allocating a first portion of a memory;
    detecting a first kernel loadable module (KLM) requesting an allocation of at least a portion of the memory;
    loading the first KLM into the first portion of the memory;
    associating a first identifier with the first KLM and the first portion;
    detecting access of a second portion of the memory by the first KLM, the second portion being distinct from the first portion;
    generating an indication that the first KLM has accessed the second portion;
    allocating a third portion of the memory, the third portion being distinct from the first and second portions;
    detecting a second KLM requesting an allocation of at least a portion of the memory;
    associating a second identifier with the third portion and the second KLM;
    loading the second KLM into the third portion and a part of the first portion; and
    associating the part of the first portion with the second identifier.

2. The method according to claim 1 and further comprising displaying the indication and determining, by a user, an action to take in response to the displayed indication.

3. The method according to claim 1 and further comprising storing the indication, wherein the indication is a storage key and wherein the association between the first identifier, the KLM and the first portion is stored in a table.

4. The method according to claim wherein the memory comprises one of virtual memory or physical memory.

5. A computer program product comprising a non-transitory computer readable storage medium having a computer readable program stored therein, wherein the computer readable program, when executed on a computing device, causes the computing device to:
    allocate a first portion of a memory; detect a first kernel loadable module (KLM) requesting an allocation of at least a portion of the memory;
    load the first KLM into the first portion of the memory;
    associate a first identifier with the first KLM and the first portion;
    detect access of a second portion of the memory by the first KLM, the second portion being distinct from the first portion;
    generate an indication that the first KLM has accessed the second portion;
    allocate a third portion of the memory, the third portion being distinct from the first and second portions;
    detect a second KLM requesting an allocation of at least a portion of the memory;

associate a second identifier with the third portion and the second KLM;
load the second KLM into the third portion and a part of the first portion; and
associate the part of the first portion with the second identifier.

6. The computer program product according to claim 5, wherein the computer readable program further causes the computing device to display the indication to allow a user to determine an appropriate action.

7. The computer program product according to claim 5, wherein the computer readable program further causes the computing device to store the indication, wherein the indication is a storage key, and wherein the association between the first identifier, the KLM and the first portion is stored in a table.

8. The computer program product according to claim 5, wherein the memory comprises one of virtual memory or physical memory.

9. An apparatus, comprising:
a processor; and
a memory coupled to the processor, wherein the memory comprises instructions which, when executed by the processor, cause the processor to:
allocate a first portion of a memory;
detect a first kernel loadable module (KLM) requesting an allocation of at least a portion of the memory;
load the first KLM into the first portion of the memory;
associate a first identifier with the first KLM and the first portion;
detect access of a second portion of the memory by the first KLM, the second portion being distinct from the first portion;
generate an indication that the first KLM has accessed the second portion;
allocate a third portion of the memory, the third portion being distinct from the first and second portions;
detect a second KLM requesting an allocation of at least a portion of the memory;
associate a second identifier with the third portion and the second KLM; and
load the second KLM into the third portion and a part of the first portion; and associate the part of the first portion with the second identifier.

10. The apparatus according to claim 8, wherein the instructions further cause the processor to display the indication to allow a user to determine an appropriate action.

11. The apparatus according to claim 8, wherein the instructions further cause the processor to store the indication, wherein the indicator is a storage key, and wherein the association between the first identifier, the KLM and the first portion is stored in a table.

12. The apparatus according to claim 8, wherein the memory comprises one of virtual memory or physical memory.

13. A method comprising:
allocating a first portion of as memory;
detecting a first kernel loadable module (KLM) requesting an allocation of at least a portion of the memory;
loading the first KLM into the first portion of the memory;
associating a first identifier with the first KLM and the first portion;
detecting access of a second portion of the memory by the first KLM, the second portion being distinct from the first portion;
generating an indication that the first KLM has accessed the second portion;
allocating a third portion of the memory, the third portion being distinct from the first and second portions;
detecting a second KLM requesting an allocation of at least a portion of the memory;
associating the first identifier with the third portion and the second KLM in addition to the first portion and the first KLM; and
loading the second KLM into the third portion.

14. A computer program product comprising as non-transitory computer readable storage medium having a computer readable program stored therein, wherein the computer readable program, when executed on a computing device, causes the computing device to:
allocate a first portion of a memory; detect a first kernel loadable module (KLM) requesting an allocation of at least a portion of the memory;
load the first KLM into the first portion of the memory;
associate a first identifier with the first KLM and the first portion;
detect access of a second portion of the memory by the first KLM, the second portion being distinct from the first portion;
generate an indication that the first KLM has accessed the second portion;
allocate a third portion of the memory, the third portion being distinct from the first and second portions;
detect a second KLM requesting an allocation of at least a portion of the memory;
associate the first identifier with the third portion and the second KLM in addition to the first portion and the first KLM; and
load the second KLM into the third portion.

15. An apparatus, comprising:
a processor; and
a memory coupled to the processor, wherein the memory comprises instructions which, when executed by the processor, cause the processor to:
allocate a first portion of a memory;
detect a first kernel loadable module (KLM) requesting an allocation of at least a portion of the memory;
load the first KLM into the first portion of the memory;
associate a first identifier with the first KLM and the first portion;
detect access of a second portion of the memory by the first KLM, the second portion being distinct from the first portion;
generate an indication that the first KLM has accessed the second portion;
allocate a third portion of the memory, the third portion being distinct from the first and second portions;
detect a second KLM requesting an allocation of at least a portion of the memory;
associate the first identifier with the third portion and the second KLM in addition to the first portion and the first KLM; and
load the second KLM into the third portion.

* * * * *